Sept. 22, 1925.  
J. C. BAUERLE ET AL  
1,554,323  
CLOTHESLINE REEL  
Filed Sept. 7, 1922  
2 Sheets-Sheet 1
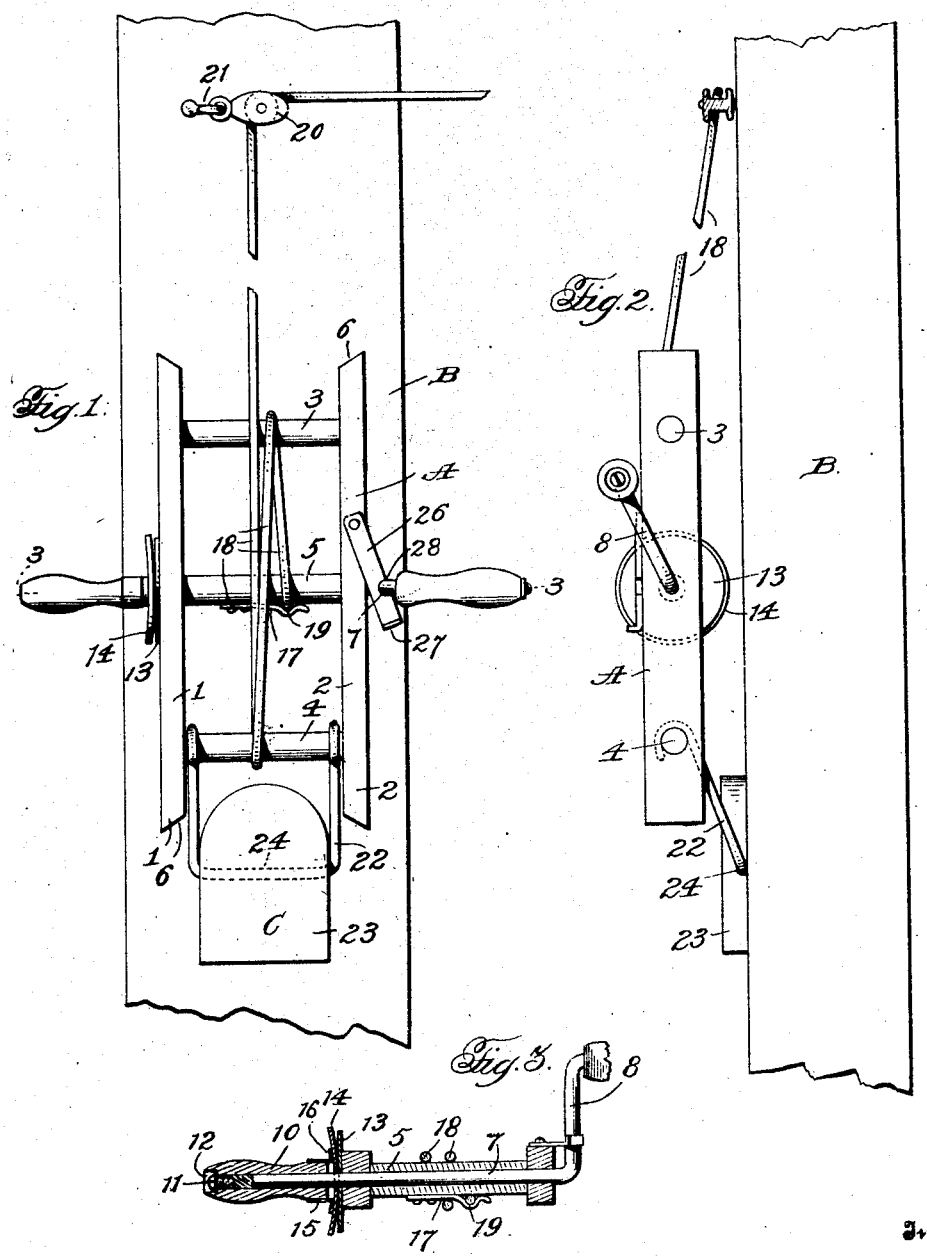

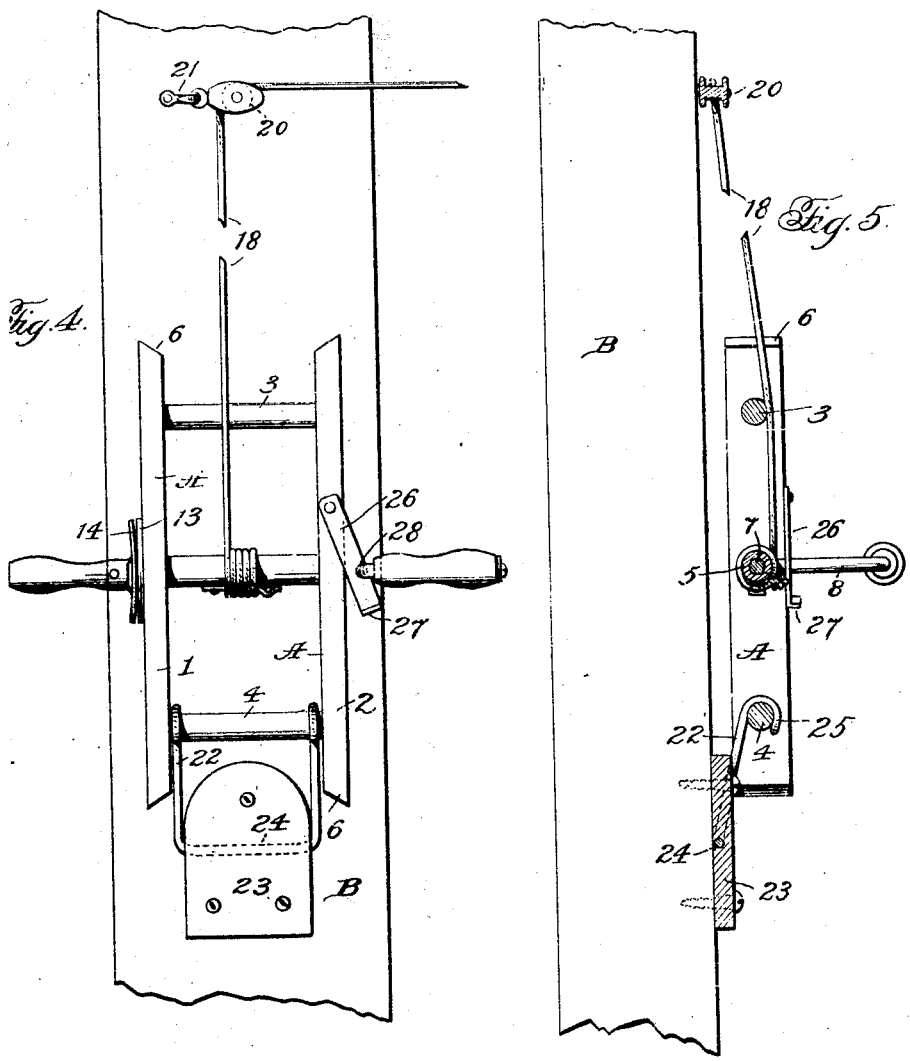

Patented Sept. 22, 1925.

1,554,323

UNITED STATES PATENT OFFICE.

JACOB C. BAUERLE AND EDWARD J. BAUERLE, OF DAVENPORT, IOWA.

CLOTHESLINE REEL.

Application filed September 7, 1922. Serial No. 586,717.

*To all whom it may concern:*

Be it known that we, JACOB C. BAUERLE and EDWARD J. BAUERLE, citizens of the United States, residing at Davenport, in the county of Scott and State of Iowa, have invented certain new and useful Improvements in Clothesline Reels, of which the following is a specification.

Our invention relates to new and useful improvements in a clothes line reel and support therefor, the principal object of the invention residing in the construction of a reel of comparatively small size which may be carried from place to place during the unwinding of the line therefrom and then may be connected to a suitable support.

Another object consists in the provision of means for drawing the line taut so that it will not be necessary to use props as an aid for supporting the weight of the clothes upon the line.

A further object resides in the provision of a brake for preventing too rapid unwinding of the line from the reel as well as means for detachably connecting the end of the line to the reel.

With the above and other objects in view, which will appear as the description proceeds, our invention consists of the novel details of construction, and arrangement of parts, described in the following specification and illustrated in the accompanying drawings, and while we have illustrated and described the preferred embodiments of the invention as it now appears to us it will be understood that we may make such changes as will fall within the scope of the appended claims.

In the drawings:

Fig. 1 is a front elevation showing the reel connected to a support, the line being shown partly wrapped around the reel.

Fig. 2 is a side elevation showing the reel connected to the support.

Fig. 3 is a transverse section on the line 3—3 of Fig. 1.

Fig. 4 is a front elevation showing the reel connected to a support with the end of the line wound upon a rotatable shaft forming a part of the reel.

Fig. 5 is a side elevation of the support with the reel connected thereto, the reel being shown in vertical section with parts in elevation.

In the drawings A denotes the clothes line reel, B the support for the line and reel, and C the member for detachably connecting the reel to the support. The reel comprises the side rails 1 and 2, the transversely extending rods 3 and 4 connecting the side rails adjacent their ends, and the rotatable sleeve or drum 5 mounted between the side rails 1 and 2 intermediate the end rods 3 and 4. The ends of the side rails 1 and 2 are inwardly beveled as shown at 6 and the sleeve 5 is carried by the shaft 7 which is rotatably mounted in the side rails, one end of the shaft being bent to form the crank handle 8, on the outside of the side rail 2, and the opposite end extending beyond the outer face of the side rail 1 to receive loosely thereon the hand hold 10 which is secured on said extension by means of a screw 11 or other suitable fastening means which is received in a recess 12 formed in the end of the hand hold. A metal plate 13 is secured to the outer face of the side reel 1 and a plate 14 of leather or other suitable flexible material is connected to the hand hold 10 by means of the metal sleeve 15 which surrounds the end of the hand hold, and has the outwardly extending arms 16 for connection to the said plate 14. Secured to the sleeve or drum 5, by means of the metal clip 17, is one end of a clothes line or rope 18. As quite clearly shown, more particularly in Figs. 1, 3 and 4, the metal clip 17 is secured to the sleeve or roller, adjacent one end, by the screw or other fastening member 18 and adjacent the opposite end is formed with a concaved recess 19 in which the line or rope is received. Carried upon the line or rope 18 will be a plurality of pulleys 20 which are adapted to be connected to hooks 21 secured to the supports.

For connecting the reel to the support I provide the swinging member 22 which is secured to the support by means of the block 23 which has a transversely extending groove 24 on its inner face for receiving the horizontal portion of the swinging member. The free ends of the swinging member are curved to form the hooks 25 which are adapted to engage around the cross rod 4 of the reel as quite clearly shown in the drawings. Pivotally connected to the side rail 2 of the reel is a plate 26 having its lower end bent at right angles as shown at 27 for providing a finger hold and having one edge notched as shown at 28 to engage the arm of the crank handle 8, as more clearly shown in Figs. 1 and 3 of the drawings, to hold said handle and the shaft 7 and the sleeve 5 forming a part thereof against rotation when desired.

As previously stated the reel is of comparatively small size so that it may be carried by the person from place to place for attachment of the line to the supports. The line or rope will be longitudinally wound upon the reel, as shown more particularly in Fig. 1 of the drawings, around the transverse rods 3 and 4, with its end connected to the metal clip 17 and as the person walks from support to support they will engage one of the pulleys 20 with the hook upon the support. When the proper amount of line has been connected to the supports the reel will be connected to the last support by means of engaging the hook portions 25 of the swinging member 22 over the lowermost transversely extending rod. In order to draw the line taut the reel may be rotated as a whole and as previously stated the lowermost rod engaged with the hooks of the swinging member. When unwinding the line from the reel the hand hold 10 will be engaged by one hand and the crank handle 8 by the other, the reel freely rotating upon the rod 7. In order to prevent too rapid rotation of the reel I provide a brake member in the form of the metal plate 13 and flexible plate 14. When the reel begins to unwind too fast the finger of the hand engaging the hand hold 10 will be pressed against the flexible plate 16 thereby forcing the same into engagement with the metal plate and hold the reel against too rapid rotation, it being understood that the metal plate is attached to the side rail of the reel whereas the flexible plate is carried by the hand hold. In other words the plate 13 rotates with the reel whereas the flexible plate is normally held stationary with the hand hold 10. Often practically the entire line is unwound from the reel and therefore in order to draw the line taut the reel as an entirety cannot be rotated. To provide for drawing the line taut when practically the entire line has been unwound we provide the rotatable sleeve or drum 5. This operates as illustrated in Figs. 4 and 5 of the drawings and in order to draw the line taut the said sleeve or drum 5 is rotated by means of the crank handle 8. The end of the line will be wound upon the sleeve or drum while the hand hold 10 is being held stationary. The reel may be easily connected to or disconnected from the support by the swinging hooked member so that with the line wound thereon it may be taken to any suitable place for storage when not in use.

Having fully described our invention what we claim as new and desire to secure by Letters Patent is:

1. In combination with a support, a clothes line reel comprising a frame formed of side rails and transverse connecting rods, and means carried by the support and engageable with one of the transverse rods for connecting the reel to the support.

2. In combination with a support, a clothes line reel comprising a frame formed of side rails and transverse connecting rods, and a swinging hook member carried by the support and engageable with one of the transverse rods for connecting the reel to the support.

3. In combination with a support, a clothes line reel, a block adapted to be secured to the support, and a swinging member carried by the block and engageable with the reel for connecting the same to the support.

4. In combination with a support, a clothes line reel, a block secured to the support and having a transversely extending recess therein, a substantially U-shaped hook member carried by the block and engageable with the reel for connecting the same to the support, the horizontal portion of the substantially U-shaped hook member being received in the transversely extending recess of the block.

5. A clothes line reel comprising a supporting shaft, a frame rotatably mounted upon the supporting shaft, a plate carried by the frame, a handle carried by the shaft, and a plate carried by the handle, one of said plates being movable with respect to the other for retarding the movement of the frame.

6. A clothes line reel comprising a frame, a shaft rotatably mounted between the sides of the frame, a crank for rotating the shaft, and a notched plate pivotally connected to the frame and engageable with the crank for preventing rotation of the crank and shaft, the notch of the plate receiving a portion of the crank.

7. A clothes line reel comprising a supporting shaft, a frame rotatably mounted upon the shaft, means for rotating the shaft independently of the frame, a handle loosely mounted upon the shaft, and means carried part by the frame and part by the handle for retarding the movement of the frame.

8. A clothes line reel comprising a supporting shaft, a frame rotatably mounted upon the shaft, a crank for rotating the shaft independently of the frame, means carried by the frame and engageable with the crank for preventing rotation of the shaft with respect to the frame, a handle loosely mounted upon the shaft, and means carried by the handle and engageable with the frame for retarding the movement thereof.

9. A clothes line reel comprising a supporting shaft, a frame rotatably mounted upon the shaft, a crank for rotating the shaft independently of the frame, a pivoted catch carried by the frame and engageable with the crank for preventing rotation of the shaft independently of the frame, a plate carried by the frame, a hand hold carried by the shaft, a flexible plate carried by the hand hold and adapted for movement into engagement with the plate of the frame, and means for connecting a clothes line to the shaft, said clothes line adapted to be wound upon the frame by rotation of the frame upon the shaft or upon the shaft upon rotation thereof by the crank independently of the frame.

10. A clothes line reel comprising a frame, a sleeve rotatably carried by the frame, a spring clamp secured to the sleeve and adapted to connect a clothes line to the sleeve, and means for rotating the sleeve relative to the frame.

11. A clothes line reel comprising a supporting shaft, a frame rotatably mounted upon the shaft, means for rotating the frame and shaft in unison and means for rotating the shaft independently of the frame.

In testimony whereof we affix our signatures.

JACOB C. BAUERLE.
EDWARD J. BAUERLE.

Certificate of Correction.

It is hereby certified that Letters Patent No. 1,554,323, granted September 22, 1925, upon the application of Jacob C. Bauerle and Edward J. Bauerle, of Davenport, Iowa, for an improvement in "Clothesline Reels," were erroneously issued to "Jacob C. Bauerle and Edward J. Bauerle" as joint owners, whereas said Letters Patent should have been issued to *Jacob C. Bauerle* as sole owner of said invention, as shown by the records of assignments in this office; and that the said Letters Patent should be read with this correction therein that the same may conform to the record of the case in the Patent Office.

Signed and sealed this 3d day of November, A. D. 1925.

[SEAL.]
KARL FENNING,
*Acting Commissioner of Patents.*